Aug. 27, 1968   D. E. SWIHART   3,399,083
THERMOELECTRIC BODY INCLUDING PYROLYZED REACTION PRODUCT OF
PYROMELLITONITRILE AND ALKANOL AND WITH
COMMINUTED METAL

Filed Feb. 17, 1964   2 Sheets-Sheet 1

FIGURE I.

INVENTOR.
DONALD E. SWIHART
BY Mary B. Moshier
ATTORNEY

INVENTOR.
DONALD E. SWIHART
BY Mary B. Mosher
ATTORNEY

United States Patent Office 3,399,083
Patented Aug. 27, 1968

3,399,083
THERMOELECTRIC BODY INCLUDING PYROLYZED REACTION PRODUCT OF PYROMELLITONITRILE AND ALKANOL AND WITH COMMINUTED METAL
Donald E. Swihart, Englewood, Ohio, assignor to Monsanto Research Corporation, St. Louis, Mo., a corporation of Delaware
Filed Feb. 17, 1964, Ser. No. 345,142
12 Claims. (Cl. 136—236)

ABSTRACT OF THE DISCLOSURE

A thermoelectric body formed by pressing together (1) the pyrolyzed reaction product of pyromellitonitrile and a lower alkanol and (2) a metal selected from the class consisting of Zn, Sb, Cu, Al, Ni and alloys of each other, and subsequently heating the resulting coherent, solid body at 200° to 800° C. The finished body is useful as a thermoelement in thermoelectric devices.

---

Figure 1:
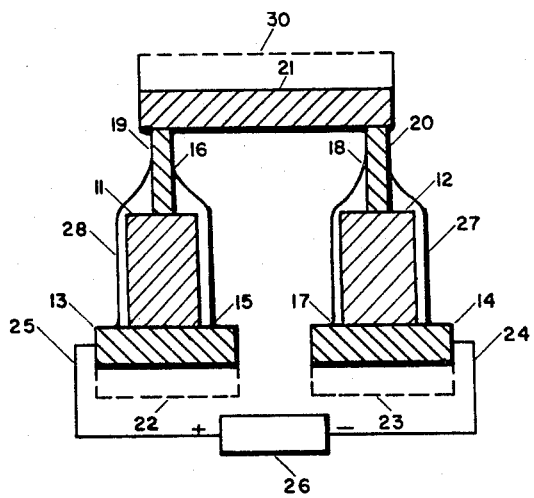

This invention relates to semiconductors and more particularly provides pyromellitonitrile/alkanol reaction products which are modified to give bodies or components or elements useful in thermoelectric devices. These bodies can be suitably in the form of disks, wafers, bars, rods, rectangular parallelepipeds, or almost any geometric shape.

In U.S. Patent No. 3,060,253, issued to Bernard S. Wildi and John E. Katon, there are disclosed pyromellitonitrile/alkanol reaction products containing, for each mole of pyromellitonitrile, two moles of a lower alkyl alcohol, i.e., methanol, ethanol, propanol, isopropanol, n-butanol, tert-butanol, n-pentanol, etc. Said products are obtained by heating at at least reflux temperatures a mixture of pyromellitonitrile and a lower alkanol to form a reaction product having substantially two moles of alcohol per mole of pyromellitonitrile and separating said reaction product from the resulting reaction mixture. Advantageously stoichiometric proportions of the nitrile and of the alkanol are employed, i.e., there is employed about two moles of alkanol per mole of the nitrile; however, an excess of the alkanol may be conveniently employed as diluent. Heating may be conducted, at say, from reflux to the decomposition point of the reactants and/or product. Generally, heating from at least the refluxing temperature to about 160° C. is useful. Separation of the reaction product is readily accomplished, since upon cooling the reaction mixture, the product precipitates and is easily filtered off. The solid reaction product, either in a compressed state or in comminuted form, is heated at from about 160° C. to about 700° C. to give a pyrolyzed pyromellitonitrile/alkanol reaction product having thermoelectric property.

It is an object of this invention to improve the thermoelectric property of bodies prepared from pyrolyzed pyromellitonitrile lower alkanol reaction products.

It is another object of this invention to provide new and useful thermoelectric bodies.

It is a further object of this invention to provide new and useful devices for generating direct current power.

It is still another object of this invention to provide new and useful devices for cooling electrothermally.

These and other objects hereinafter defined are provided by the invention wherein there are contacted together (1) a pyrolyzed reaction product obtained by heating at at least reflux temperature a mixture of pyromellitonitrile and a lower alkanol to form a reaction product having substantially two moles of said alkanol per mole of said nitrile, separating said reaction product, and heating the separated product at a temperature in the range of about 160° C. to about 700° C., with from 0.5% to 95% by weight of (2) a metal selected from the class consisting of zinc, antimony, copper, aluminum and nickel and alloys of each other, and pressing and heating the pyrolyzed reaction product and the metal while in contact with each other, the pressing being conducted at a pressure sufficient to form a solid, coherent body and the heating being conducted at a temperature of from 200° C. to 800° C., and preferably at from 250° C. to 700° C.

The pyrolyzed reaction product may or may not be in comminuted form. The separated, solid pyromellitonitrile/alkanol reaction product may be first pressed into a shaped form, e.g., a disk or pellet, and then pyrolyzed. The pyrolyzed, shaped body may then be contacted with the metal, which also may or may not be in comminuted form. For example, a disk of the pyrolyzed reaction product may be stacked in two or more layers, alternately, with a disk of the metal, and the resulting assembly may be cold-pressed or heat-pressed to give a coherent element. When cold-pressing is employed, subsequent heat-treatment of the pressed body results in highly improved thermoelectric property. Use of heat during pressing eliminates the necessity of a subsequent heating step, and such a procedure is particularly advantageous when the nitrile-alkanol reaction product is not in comminuted form since flow is thus more easily attained. When one of the components is comminuted, it is distributed on the surface of a sheet of the other component. For example, a disk of metal is first inserted into a die press and the disk is covered with the powdered, pyrolyzed, pyromellitonitrile-alkanol reaction product; or alternate layers of a metal sheet and the powdered reaction product are assembled and pressed into laminates either at room temperature, whereby subsequent heat-treatment of the laminate is employed, or at the temperature at which heat-treatment would be conducted had cold-pressing been employed, i.e., at a temperature within the range of about 200° C. to 800° C. Two-ply or multi-ply laminates are also made by adding alternate layers of powdered reaction product and powdered metal to a press form. In another embodiment, the pyrolyzed reaction product in powdered form is introduced into a die containing a metal core, which may be cylindrical, rectangular, or of any shape, and said reaction product is compression molded around the core to give an element wherein a layer of the reaction product is firmly bonded to the surface of the core.

A very convenient means of forming a thermoelement of the pyrolyzed reaction product and metal comprises mixing of the powdered or granulated reaction product with powdered or granulated metal. Pressing of the mixture gives a composite wherein the metal and the pyrolyzed reaction product are in uniform, intimate contact.

The means of contact will vary with the intended uses of the thermoelectric body. As will be appreciated by those skilled in the art, for some purposes, e.g., in the manufacture of bodies which can serve as either N-type or P-type thermoelements, segmented bodies or two-ply structures are useful. In such structures the metal surface will generally be at the cold junction of a thermoelectric device when it is desired to use the body as an N-type element, and at the hot junction when the body is to function as a P-type element.

The quantity of metal with which the pyrolyzed pyromellitonitrile-alkanol reaction product is contacted will vary with the nature of the metal, the extent of heat treatment, and with the properties desired in the finished body, but will generally be from, say, 0.5% to 95%, and preferably from 1.0% to 85% of the weight of said reaction product. It has been found that of the five metals, zinc, antimony, aluminum, copper and nickel, zinc is generally more efficient, with respect to thermoelectric effect, than are the other four metals. For example, at a 30% by weight concentration of metal and heat treatment at 375° C. for 16 hours, a two layer disk containing antimony has a $\mu v/\Delta T$ value of $-70$ at $\Delta T$, ° C. of 170, whereas, substitution of zinc for the antimony, but otherwise employing the same conditions results in a $\mu v/\Delta T$ value of $-106$ at the same $\Delta T$, ° C. When employing mixtures of the powdered components, rather than layers of powder and/or solid, continuous bodies, use of even very low concentrations of metal results in excellent thermoelectric power. Thus, when used in a formed composite which has been heat treated at 330° C. for 16 hours, zinc gives a $\mu v/\Delta T$ value of $-129$ at $\Delta T$, ° C. of 150, and improved thermoelectric power over that obtained with the pyrolyzed pyromellitonitrile-methanol reaction product is obtained when the zinc is present as a dispersion in the composite in a concentration of as low as 0.5%, based on the weight of the composite. The maximum amount of metal present in the heat-treated bodies is generally upward to, say, about 95% by weight of the body, i.e., as little as 5% by weight of the pyrolyzed reaction product may be present. However, as the metal content becomes greater than that of the pyrolyzed reaction product, negative thermoelectric property decreases. For example, a composite prepared from equal weights of said reaction product and zinc and heat treated at 350° C. for 16 hours has a $\mu v/\Delta T$ value of $-166$ at $\Delta T$, ° C. of 151, whereas, a similarly prepared body containing 70% by weight of zinc, based on said reaction product, has a value of $-106$ under the same conditions. As the metal content increases, the thermoelectric power becomes less negative, and finally becomes positive. Thermoelectric elements of the P-type are thus arrived at. Whether a concentration of one or more of the present metals is sufficient to give an N-type element or a P-type element can be easily determined by routine experimentation. For production of N-type elements, it is usually recommended that the metal be the minor component; however, as pointed out above, even at a 70% weight concentration, the use of zinc with the pyrolyzed mellitonitrile-alkanol reaction product gives very good negative thermoelectric power.

Heating of bodies which have been formed from the pyrolyzed reaction product and one or more of the present metals is an essential feature of the invention. Thus, although the thermoelectric power, $\mu v/\Delta T$, of a composite body containing 30% by weight of antimony is $-96$ at $\Delta T$,° C. of 131 after it has been heated for 16 hours at 330° C., it is only $-8$ at $\Delta T$ of 139° C. before the heat treatment. Although the mechanism responsible for the improved results obtained by heat treatment of the metal-containing bodies is not understood, it is believed that the heat-treatment causes some diffusion between the nitrile-alkanol reaction product and the metal component. The heating time will depend upon the temperature which is used, temperatures at the top of the 200–800° C. range generally requiring a shorter heating time than when the heating is conducted at low temperatures within the range. The extent of heating will also depend upon the nature of the formed body; composites formed from intimately mixed, comminuted components may need only a short heating time at high temperatures to obtain properties which are better attained with laminates when longer heating at lower temperatures are used. In experimental runs, it is recommended that heating be initiated within the low temperature range, and that frequent observations be made in change of thermoelectric power in order to arrive at the optimum heating time. Determination of suitable heating conditions is readily realized by those skilled in the art, so long as heating is conducted at above about 200° C. and for a time sufficient to show improvement over the metal-free, pyrolyzed pyromellitonitrile-methanol reaction product. Generally, as heating progresses, the thermoelectric power value of the metal-containing body reaches a peak value upon which prolonged heating generally has little, if any, effect.

The invention is further illustrated by, but not limited to the following examples.

Example 1

This example describes the preparation of pyrolyzed pyromellitonitrile-methanol reaction product.

A mixture consisting of 50 g. of the nitrile and 3 liters of methanol was refluxed for 24 hours. It was filtered while hot and the filtrate was concentrated to about one-half of its original volume and allowed to cool. The green, solid 1:2 molar ratio pyromellitonitrile reaction product which formed in the cooled filtrate was filtered off and air-dried. It was then pyrolyzed by heating it at 250° C. for 18 hours under vacuum.

Example 2

A portion of the pyrolyzed material of Example 1 was powdered and formed into disks of only the pyrolyzed product and into disks consisting of a layer of antimony and a layer of the pyrolyzed product. The antimony containing disks were made by inserting a thin sheet of the antimony into a 22 x 4.6 mm. die, covering it with said powdered product and pressing the assembly at room temperature at a pressure of 5500 kg./sq. cm. to obtain a laminated wafer having a thickness of about 0.6 mm. The antimony-free disks were made by similarly pressing the powder, alone, to give a wafer of substantially the same thickness. The disks were then heated under vacuum at 375° C. for 2.5 hours.

Testing for thermoelectric power was conducted as follows: Each test disk was placed on a gold plated copper plate which served as the cold (about 22° C.) electrode of the thermoelectric generator. The data below were obtained from measurements made with the pyromellitonitrile-methanol reaction product at the hot junction, the hot electrode for the generator being a soldering iron having a gold-plated tip which was mounted in a jig and could be raised or lowered by a screw arrangement. When the antimony was placed at the hot junction, a relatively low, positive thermoelectric power was observed. Three measurements were taken at different points on the sample and averaged for the thermoelectric power reported. During the measurements, the soldering iron was pressed against the upper surface of the sample, with sufficient pressure being applied to give good ohmic contact for the soldering iron and the copper plate with the sample. The series electrical circuit was completed with the gold-plated copper plate through a galvanometer, soldering iron, the sample, and back to the copper plate. In the tests, the hot probe was heated before being applied to the disk. The actual hot probe and cold plate temperature was allowed to come to equilibrium and the highest voltage generated was recorded.

The following values were obtained with a cold junction temperature of 22° C. and the differences between the cold junction and hot junction temperature ($\Delta T$) are shown below.

| $\Delta T$., ° C. | No antimony | | With antimony | |
|---|---|---|---|---|
| | $\mu v$. | $\mu v./\Delta T$. | $\mu v$. | $\mu v./\Delta T$. |
| 111 | $-120$ | $-1.080$ | $-3,000$ | $-27.00$ |
| 131 | $-150$ | $-1.145$ | $-5,200$ | $-39.60$ |
| 151 | $-180$ | $-1.200$ | $-8,000$ | $-53.00$ |
| 170 | $-250$ | $-1.470$ | $-14,000$ | $-82.30$ |

The above data show that the inclusion of antimony with the pyrolyzed pyromellitonitrile-methanol reaction product gave negative thermoelectric power values ($\mu v./\Delta T$.)

which were far superior to those obtained with said reaction product alone.

The electrical resistivity of the disks, determined in air with a Simpson volt-ohm-milliameter, was found to be $2.23 \times 10^6$ ohm-cm. for the antimony-containing disk and $8.88 \times 10^6$ ohm-cm. for the disk which contained no antimony.

When the hot probe was placed at the antimony side of the disk, positive thermoelectric power was obtained, as follows:

| $\Delta T.$, °C. | $\mu v.$ | $\mu v./\Delta T.$ |
|---|---|---|
| 91 | +10 | +0.110 |
| 99 | +25 | +0.253 |
| 105 | +32 | +0.305 |

Example 3

Five disks were pressed, using some of the pyrolyzed pyromellitonitrile-methanol reaction product prepared in Example 1. One disk was prepared with only said reaction product. The other four disks contained one of the metals: antimony, zinc, copper and nickel. A layer of the powdered metal was first poured into the die, and then a substantially equal volume of the powdered reaction product was poured over the metal. Dies of the same dimension were used, and pressure applied was the same. The disks thus obtained were then heated under vacuum for 4 hours at 400° C. Measurements of thermoelectric properties of the resulting disks, conducted as described in Example 2, with the hot probe at the nitrile-methanol reaction product side of the disk, gave the following values:

| $\Delta T.$, °C. | Thermoelectric power, $\mu v./\Delta T.$ | | | | |
|---|---|---|---|---|---|
| | No metal | With Sb | With Cu | With Zn | With Ni |
| 111 | −7.6 | −79.3 | −21.6 | −66.7 | −48.6 |
| 132 | −13.6 | −83.4 | −36.4 | −90.8 | −68.2 |
| 151 | −14.6 | −92.8 | −41.0 | −106.0 | −79.5 |
| 170 | −14.1 | −106.0 | −56.5 | −117.5 | −82.4 |
| 189 | | −106.0 | −68.8 | −121.5 | −100.0 |

The resistivities were found to be as follows:

Disk with—   Ohm-cm.
- No metal _____ $1.12 \times 10^5$
- Sb _____ $7.6 \times 10^4$
- Cu _____ $1.06 \times 10^6$
- Zn _____ $3.17 \times 10^5$
- Ni _____ $5.28 \times 10^5$ In order to determine the efficacy of the antimony-containing disk for use as a p-type thermoelement, thermoelectric power was also determined by applying the hot probe to the antimony side of the disk. The following values were thus obtained:

| $\Delta T.$, °C. | $\mu v./\Delta T.$ |
|---|---|
| 91 | +9.68 |
| 111 | +14.30 |
| 132 | +7.20 |
| 151 | +7.85 |

Heating of the antimony-containing disk at 400° C. for an additional 16 hours gave a $\mu v./\Delta T.$ value of −106 at $\Delta T.$, °C. of either 151° C. or 170° C. When heating of the copper-containing disk was similarly continued, there was obtained a $\mu v./\Delta T.$ value of −63.0 at $\Delta T.$, °C. of 151 and −64.6 at $\Delta T.$, °C. of 170.

Example 4

Pyrolyzed pyromellitonitrile-methanol reaction product, prepared as described in Example 1 was pulverized and intimately mixed with an equal amount, by weight, of powdered aluminum. The mixture was pressed at room temperature to give a 0.14 cm. thick disk, and said disk was then heated under vacuum at 375° C. for 16 hours. Testing of the disk by the procedure described in Example 2 gave a $\mu v./\Delta T.$ value of −43 at $\Delta T.$, °C. of 170.

Example 5

In order to ascertain the effect of the thickness of the metal layer in two-ply disks prepared from pyrolyzed pyromellitonitrile-methanol reaction product, disks were prepared by pouring into like dies first a layer of powdered zinc and then a layer of the pyrolyzed reaction product described in Example 1, the quantity of reaction product and zinc being varied as follows:

| Sample | Reaction product, g. | Zinc, g. |
|---|---|---|
| A | 0.1293 | 0.7464 |
| B | 0.0646 | 1.4928 |
| C | 0.2586 | 0.3732 |

The same pressure was applied in each case. The thickness of the disk obtained from (A) was 0.058″, that from (B) was 0.079″ and that from (C) was 0.073″. In the (A) disk the thickness of the zinc layer of the disk was about equal to that of the nitrile-methanol reaction product; in the (B) disk the zinc layer was about twice as thick as the layer of said reaction product, and in the (C) disk the layer of zinc was about one-half the thickness of that of said reaction product. Testing of the disks as described in Example 2, with the hot probe at the reaction product side, gave the following results:

| $\Delta T.$, °C. | Thermoelectric power, $\mu v./\Delta T.$ | | |
|---|---|---|---|
| | A | B | C |
| 111 | −47.8 | −56.4 | −45.0 |
| 132 | −53.0 | −75.6 | −57.5 |
| 151 | −72.8 | −92.6 | −66.2 |
| 170 | −76.5 | −100.0 | −76.5 |

Example 6

Pyrolyzed pyromellitonitrile-methanol reaction product, prepared as described in Example 1, was powdered and intimately mixed with finely powdered zinc to give respective mixtures containing either 10% or 30% of zinc based on the total weight of each mixture. The mixtures were placed in respective dies and pressed as in Example 2. The composites thus obtained were heated in vacuum at 375° C. for 16 hours to give, from the 10% zinc mixture, a disk having a thickness of 0.17 cm. and, from the 30% zinc mixture, a disk having a thickness of 0.14 cm. Testing of the disks as in Example 2 gave the following values:

| $\Delta T.$, °C. | Thermoelectric power, $\mu v./\Delta T.$ | |
|---|---|---|
| | 10% Zn | 30% Zn |
| 111 | −34.2 | −57.7 |
| 132 | −49.2 | −66.6 |
| 151 | −66.2 | −79.5 |
| 170 | −64.8 | −106.0 |

When antimony was used instead of zinc at the 30% concentration the value for $\mu v./\Delta T.$ at $\Delta T.$, °C.=170 was found to be −70.

Example 7

Powdered zinc was intimately mixed with powdered, pyrolyzed pyromellitonitrile-methanol reaction product, prepared as described in Example 1, to give respective mixtures containing 50% or 70% by weight of zinc based on the total weight of each mixture. The mixtures were placed in respective dies, and pressed as in Example 2. The composites thus obtained were heated in vacuum at 350° C. for 16 hours to give, from the 50% mixture, a disk having a thickness of 0.13 cm. and, from the 70% mixture, a disk having a thickness of 0.11 cm. Testing as in Example 2 gave the following values:

| ΔT., °C. | Thermoelectric power, μv./ΔT. | |
|---|---|---|
| | 50% Zn | 70% Zn |
| 24 | −25.9 | −12.5 |
| 47 | −89.3 | −42.5 |
| 69 | −101.0 | −40.6 |
| 90 | −122.0 | −53.4 |
| 111 | −136.0 | −81.8 |
| 131 | −152.0 | −99.2 |
| 151 | −166.0 | −106.0 |

The electrical resistivity of 50% Zn disk was found to be $2.25 \times 10^4$ ohm-cm. and that of the 70% Zn disk was $3.44 \times 10^4$ ohm-cm.

Example 8

This example shows the improved results obtained by heat treatment of disks obtained by pressing powders at room temperature as described in Example 2. The following were charged to respective dies and pressed under the same conditions:

(1) Powdered pyrolyzed pyromellitonitrile-methanol reaction product prepared as described in Example 1.

(2) An intimate mixture of said powdered reaction product and 2% by weight of powdered antimony based on the weight of said reaction product.

(3) Like (2) except that the quantity of antimony was 30% by weight.

(4) Like (2) except that zinc was used instead of antimony.

(5) Like (2) except that instead of the 2% of antimony there was used 50% of zinc.

Testing as in Example 2 gave the following results:

| Disk from mix | Heat Treatment | | ΔT., °C. | μv./Δ T. |
|---|---|---|---|---|
| | °C. | Hrs. | | |
| (1) | None | None | 133 | −1 |
| | 330 | 16 | 119 | −21 |
| (2) | None | None | 139 | −8 |
| | 330 | 16 | 131 | −96 |
| (3) | None | None | 139 | −15 |
| | 330 | 16 | 137 | −120 |
| (4) | None | None | 154 | −15 |
| | 330 | 16 | 150 | −129 |
| (5) | None | None | 158 | −27 |
| | 330 | 16 | 154 | −132 |

It will be noted that even with as little as 2% of antimony (mix 2) or of zinc (mix 4) very good thermoelectric properties are obtained.

Example 9

This example described elements prepared from pyrolyzed pyromellitonitrile-methanol reaction product and a mixture of copper and antimony in alloying ratio. The powdered metals were mixed with the powdered reaction product and hot-pressed, instead of cold-pressed as in the previous examples. No heat treatment was employed after pressing.

A mix was prepared consisting of the nitrile-methanol reaction product and 80% by weight of said product of a mixture consisting of 51.17% by weight of copper and 48.83% by weight of antimony, i.e., copper to alloy ratio calculated to give the alloy $Cu_2Sb$ during the hot pressing. The mix was die-pressed while gradually heating to a temperature of 400° C., being subjected to a temperature increase and decrease for about 2 hours. Testing of the pressed element thus obtained, using the testing procedure described in Example 2, gave a value for $\mu v/\Delta T$ of −174 at ΔT, °C.=142 and an electrical resistivity of $3.14 \times 10^{-1}$ ohm-cm. at 25°/C. On the other hand, a similarly hot-pressed mixture consisting only of 51.17% copper and 48.83% antimony gave a $\mu v/\Delta T$ value of +4 at ΔT=150; and under the same conditions a similarly pressed body of only the pyrolyzed pyromellitonitrile-methanol gave a $\mu v/\Delta T$ value of only −25.

The combination of low resistivity and high thermoelectric power possessed by the element formed from the pyrolyzed pyromellitonitrile-methanol reaction product, copper and antimony is remarkable. The element is of outstanding utility in the semiconductor field.

The accompanying drawings show the use of presently provided bodies in electric power-generating and electrothermally cooling devices.

FIGURE 1 broadly embodies a thermoelectric device which can be either a thermoelectric generator or a thermoelectric cooling device depending on the designation of certain of the components. For the thermoelectric generating device a body 11 in the form of an N-type body of this invention is used, the body 12 is a P-type wafer of this invention. Electrodes leading from the tops of the disks 11 and 12 are numbered 19 and 20, and these electrodes can be copper, aluminum or other suitable conductors. Ohmic contact can be made between disks 11 and 12 and electrodes 19 and 20, respectively, by coating the upper surface of the disks with silver or other noble metal (not shown) and soldering the electrodes thereto, with, e.g., a lead-tin eutectic alloy having some cadmium therein. The coating of silver, for example, can be applied to the top of the disks by evaporation of the silver onto the disk tops or alternatively with silver paint, which is commercially available. The other ends of the electrodes, 19 and 20 are then connected by soldering or other suitable mechanical means to cold junction body 21, which is a copper or aluminum rectangular plate. The hot junctions of the device consist of copper or aluminum bodies 13 and 14, which are suitably in the form of rectangular plates and are electrically connected to disks 11 and 12 in a similar manner as were electrodes 19 and 20.

Disks 11 and 12 can be enclosed in glass shells 27 and 28, which are sealed to the hot junction bodies 13 and 14 which are rectangular copper or aluminum plates by metal to glass seals 15 and 17. These metal seals for use in sealing metal to glass, i.e., making metal to glass junction seals, are well-known and commercially available. Similar metal seals 16 and 18 are used to seal the glass envelope to electrodes 19 and 20. Glass seals such as have been proposed can be be used where it is desirable to encapsulate the disks for one reason or another. Thus the disks 11 and 12 or one of them can be surrounded by any desired atmosphere, inert or otherwise, or by high vacuum, if desired.

If the device of FIGURE 1 is to be a thermoelectric generating device, elements 22 and 23 are some sort of heating source, such as a heating jacket, gas burners, etc. It is desirable although not mandatory that the cold junction 21 have the heat removed therefrom by a cooling jacket 30, which is attached to plate 21. Cooling fluid, for example, water is circulated through jacket 30 to remove the heat transmitted by the hot junctions to plate 21. Suitably also, plate 21 is cooled by forced drafts or air as by a fan blowing over the surface of plate 21. With such an arrangement as this, i.e., heated plates 13 and 14 and cooled plate 21, a thermoelectric current will be generated in disks 11 and 12, and if 26 is a load such as a radio receiver, a storage battery to be charged, a microswitch or other type of switch to be operated, or other electrical device, power will be provided to operate the electrical device. The positive and negative terminals of the device are indicated in FIGURE 1 at opposite ends of load 26. Voltage generated can be increased by connecting a number of such N-type and P-type bodies in series. For increased current flow, a number of the bodies are connected in parallel.

If instead of a load 26, a battery 26 or other direct current source of electricity is connected with positive and negative terminals as indicated in FIGURE 1, a thermoelectric cooling system results. In this system the cold junction will be plate 21 and the hot junction plates 13 and 14. In a refrigerating apparatus, for example, or for that matter in other cooling devices, it is desirable for maximum heat removal from the hot junctions to add cooling fins to plates 13 and 14. Also, suitably heat transfer fins are added to plate 21 to absorb heat and transmit it to plate 21. For use in refrigeration cold junction 21 would, of course, be positioned within the compartment or area to be cooled, whereas the hot junctions would be positioned outside of the area being cooled. A number of the devices of FIGURE 1 could be electrically connected in parallel or in series as would be most appropriate to increase the cooling surface and capacity.

Figure 2:
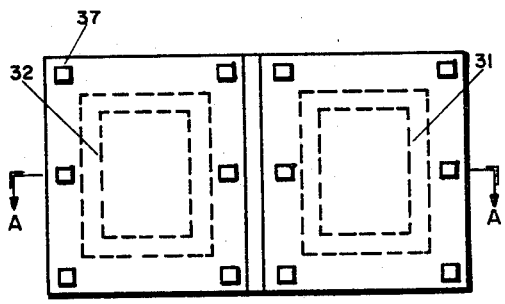
Figure 3:
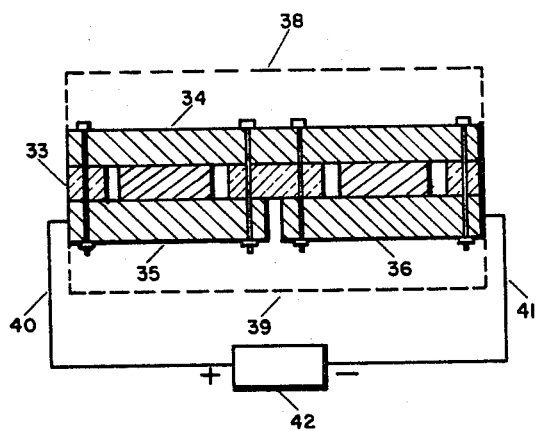

FIGURES 2 and 3 show another embodiment of the invention. Bodies 31 and 32 suitably in the form of rectangular plates are P-type and N-type bodies of this invention. Body 34, suitably a copper or aluminum rectangular plate, serves as the cold junction for the device, being bonded to plates 31 and 32 in a similar manner to that described in FIGURE 1. The hot junction bodies 35 and 36 suitably copper or aluminum plates are in a like fashion electrically connected to disks 31 and 32 to form ohmic junctions therewith. Gasket 33 is normally preferably made of an inorganic material such as glass, mica, or other materials which will withstand high temperatures, if the thermoelectric device is to be subjected to high temperature. If the device is not to be subjected to high temperatures, rubber or other similar gaskets can be used. Gasket 33 serves as an insulating separator between plates 34 and 35 and 36, and also serves to enclose on the sides thermoelectric disks 31 and 32. Thus with the metal plates 34, 35 and 36, and the gasket 33, plates 31 and 32 are encapsulated in separate compartments surrounded on the sides by vapor spaces. To prevent electrical short-circuiting of the device bolts and nuts 37 must be insulated from metal plates 34, 35 and 36 by electrical insulating washers and sleeves made of conventional materials such as rubber or inorganic materials described above, if the device is to be used at high temperatures.

As in FIGURE 1, if the device is a thermoelectric generator, it is necessary to have a heating means 39 which can be the same as described in FIGURE 1 for heating hot junctions which are plates 35 and 36, and it is desirable for maximum efficiency although not mandatory that cold junction plate 34 be cooled by conventional means 38 such as described with respect to FIGURE 1. Leads 40 and 41 connect electrically hot junction plates 35 and 36 with a load 42, which can suitably be the same type of load as employed in the thermoelectric generator of FIGURE 1.

If the device of FIGURES 2 and 3 is used as a thermoelectric cooling device, it is desirable to attach fins to hot junctions 35 and 36. It is also desirable to employ a blower or other cooling device 39 for the purpose of aiding the removal of heat from the hot junctions. Likewise it is desirable to employ cooling fins attached to cold junction 34 for gathering heat from the enclosure which is being cooled and conducting it to the cold junction. A D.C. voltage source 42 such as a battery is connected in the circuit as indicated by the plus and minus terminals on FIGURE 3 to serve as the source of power to operate the cooling device.

As in the case of the device of FIGURE 1 whether used for electrical power generation or cooling, a number of the devices of FIGURES 2 and 3 can suitably be electrically connected in parallel or series.

If the thermoelectric disks are not enclosed in housings such as in FIGURE 1 and FIGURES 2 and 3, it will be desirable in some cases to encapsulate the disks except at the electrode connections, for example, by covering the disks with a protective film of silicone varnish, glass, plastic resin, etc.

In the devices of FIGURES 1–3, either the N-type bodies or the P-type body of this invention can be replaced by another N-type or P-type body, e.g., N-type bismuth telluride or P-type bismuth telluride could be used. Other N-type or P-type thermoelectric bodies either organic or inorganic can be used in conjunction with a P-type or an N-type body of this invention.

Although the invention has been described in terms of specified apparatus which is set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What I claim is:

1. A thermoelectric body prepared by pressing together to a solid, coherent body (1) the comminuted pyrolyzed reaction product obtained by heating at at least reflux temperature a mixture of pyromellitonitrile and a lower alkanol to form a reaction product having substantially two moles of said alkanol per mole of said nitrile, separating, and comminuting said reaction product, and heating the separated product at a temperature of about 160° C. to about 700° C., with from 2% to 80% by weight of (1) of (2) a comminuted metal selected from the class consisting of zinc, antimony, copper, aluminum, nickel and alloys of each other, and heating said solid body at a temperature of from 200° C. to 800° C.

2. The thermoelectric body defined in claim 1 further limited in that the metal is zinc.

3. The thermoelectric body defined in claim 1 further limited in that the metal is antimony.

4. The thermoelectric body defined in claim 1 further limited in that the metal is copper.

5. The thermoelectric body defined in claim 1 further limited in that the metal is aluminum.

6. The thermoelectric body defined in claim 1 further limited in that the metal is nickel.

7. A thermoelectric device comprising an N-type thermoelectric element and a P-type thermoelectric element with electrical connections to said elements, at least one of said elements being formed of the body defined in claim 1.

8. A thermoelectric generating device comprising an N-type element and a P-type element, electrical connections joining said elements, other electrical connections for joining said elements through an electrical load, and means for associating a heating source associated with a pair of the portions of said elements, at least one of said elements being formed of the body defined in claim 1.

9. A solid, thermoelectric body prepared by forming under pressure at a temperature of 200–800° C. a mixture consisting essentially of (1) the finely comminuted, pyrolyzed reaction product obtained by heating at at least reflux temperature a mixture of pyromellitonitrile and a lower alkanol to form a reaction product having substantially two moles of said alkanol per mole of said nitrile, separating said reaction product, and heating the separated product at a temperature of about 700° C., and (2) at least two metals in finely comminuted form and selected from the class consisting of zinc, antimony, copper, aluminum and nickel, the proportion of (2) being from 2% to 80% by weight of (1).

10. The thermoelectric body defined in claim 9, further limited in that the two metals are copper and antimony in a quantity corresponding to $Cu_2Sb$.

11. A thermoelectric generating device comprising an N-type element and a P-type element, electrical connections joining said elements, other electrical connections for joining said elements through an electrical load, and means for associating a heating source associated with a pair of the portions of said elements, at least one of said elements being formed of the body defined in claim 10.

12. A thermoelectric generating device comprising an N-type element and a P-type element, electrical connections joining said elements, other electrical connections for joining said elements through an electrical load, and means for associating a heating source associated with a pair of the portions of said elements, at least one of said elements being formed of the body defined in claim 9.

References Cited

UNITED STATES PATENTS

| | | | |
|---|---|---|---|
| 3,060,253 | 10/1962 | Wildi et al. | 136—236 X |
| 3,129,117 | 4/1964 | Harding et al. | 136—201 X |
| 3,164,892 | 1/1965 | Lieberman et al. | 136—201 X |

OTHER REFERENCES

"Proceedings of the Princeton University Conference on Semiconduction in Molecular Solids," Curtis Press, Philadelphia, Pa. (only pp. 93, 94, 96, 97, 100, 103–106, 118, 119 relied upon).

Horne et al.: Forming Integral Pressed Contacts for Thermoelectric Elements, in RCA TN 304, November 1959.

ALLEN B. CURTIS, *Primary Examiner.*